Aug. 8, 1961  E. H. SIEGLER, JR  2,994,950
METHOD OF MANUFACTURE OF ADJUSTABLE OPTICAL SLITS
Filed July 19, 1957

INVENTOR.
E. H. SIEGLER, JR.
BY
ATTORNEY

United States Patent Office 2,994,950
Patented Aug. 8, 1961

2,994,950
METHOD OF MANUFACTURE OF ADJUSTABLE OPTICAL SLITS
Edouard Horace Siegler, Jr., Darien, Conn., assignor to The Perkin-Elmer Corporation, Norwalk, Conn., a corporation of New York
Filed July 19, 1957, Ser. No. 673,089
3 Claims. (Cl. 29—434)

This invention is concerned with a novel method and art of manufacture of adjustable optical slits. The present invention is particularly well-suited to the manufacture of multiple slit arrangements such as the type which includes entrance and exit slits, for instance, in an optical system utilizing visible light, ultraviolet, infrared, or near infrared spectral bands of energy.

The unique method of manufacture taught by the present invention produces pre-aligned optical slits inexpensively and assures that the predetermined alignment of the slits is precisely and accurately preserved throughout their entire operative range of adjustability.

In the past, adjustable optical slits of high precision have been relatively costly to manufacture. Typical of prior art practices is the fabrication of slit jaws by accurately grinding and shaping metal elements to a knife-like edge to define the limits of the optical slit area. Thereafter, the mounting of the slit jaws in correct alignment has been conventionally accomplished by relatively tedious and time-consuming procedures, usually involving a series of adjustments and optical tests until acceptable accuracy is finally achieved.

The present invention has as its primary object the inexpensive manufacture of adjustable optical slits of high quality and precise alignment. Inherent in the object of the invention is the requirement that the new method of manufacture be simple, uncomplicated and comprise a minimum number of operations which may be accomplished without the employment of special, highly developed skills.

The concept of the present invention not only eliminates the necessity for shaping knife-edge slit jaws, but also provides that the slits may be initially formed in perfect alignment, the slit opening and slit jaws being fabricated in the same operation. Moreover, the present invention teaches a method of mounting the slits which maintains their alignment in exact fixed relationship until after the slit jaws have been affixed to adjustable means. Then, by a succeeding step of the unique method of manufacture, the slit jaws are rendered movable relative to each other, and the predetermined alignment is accurately preserved.

The unique method of fabrication taught by the present invention insures a greater degree of production uniformity which, in turn, affords better reproducibility and reliability of the operative optical characteristics of the slits thus produced.

The present invention will be better understood by reference to the accompanying drawings together with the description of the slits produced by the new method of manufacture.

Briefly, the method of the present invention contemplates the following principal steps in the manufacture of adjustable optical slits.

A single or multiple aligned slit opening is formed within a platen, preserving a unitary margin so that the slit areas are in effect openings in a rigid plate. The rigid plate is affixed to a movable slit mount adjacent each slit opening and, after having been so mounted, marginal portions of the platen are removed, thereby rendering the slit openings adjustable while maintaining and preserving the original alignment of the slit jaws with respect to each other.

Figure 1:
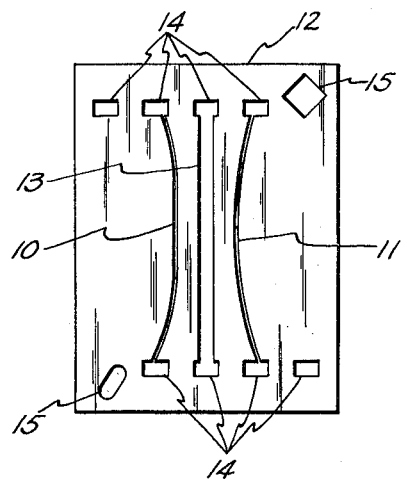
FIG. 1 is a view of a typical platen in which multiple slits have been formed.

The first step in the novel method of manufacture, that of forming the slit opening in a platen, may be conveniently and readily accomplished by well-known and conventional photo-etching techniques. In a multiple slit arrangement providing both entrance and exit slits, such as is illustrated in FIG. 1, the slits 10 and 11 may be photo-etched on a copper plate 12 of sufficient rigidity. A copper plate of six-thousandths of an inch thickness has been found to provide adequate rigidity in one particular embodiment having adjustable optical slits which are fabricated in accordance with the teaching of the present invention.

A third substantially rectangular opening 13 is also photo-etched in the platen 12. The third opening 13 is provided to afford synchronous adjustability of both the entrance and the exit slit openings 10 and 11 throughout their entire usable range of operation. The manner in which the third opening 13 coacts to afford adjustability of the slit openings 10 and 11 will be appreciated readily from an understanding of the operation of the finished adjustable optical slit assembly which will be described and explained later. The ends of both slits 10 and 11, as well as the tertiary opening 13, are all provided with small rectangular openings 14 which are proportioned and spaced to facilitate the final step in the fabrication of the slits by the new method. The reason for the small rectangular openings 14 and the advantage of having such openings photo-etched in the platen 12 will appear from a description of the final step in the fabrication of the slits which will be elaborated upon hereinafter.

Additional openings 15 of distinctive shape and size may be included in the platen 12 to facilitate positioning the slit platen in a jig adapted to facilitate the assembly of optical slits manufactured by the steps of the present invention. In assembling the adjustable optical slits in accordance with the teaching of the new method of manufacture, a suitable jig provides a means of conveniently and quickly establishing the correct spatial disposition of the slits in relation to the adjustable mount to assure that the slit platen will be accurately positioned when it is affixed to the mount.

Figure 2:
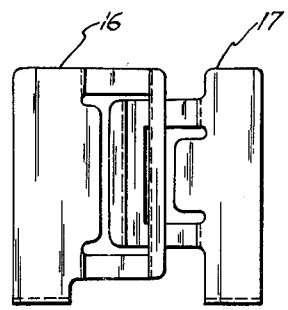
FIG. 2 is a view of adjustable slit jaw mounts such as may be conveniently employed in fabricating the adjustable optical slits in accordance with the teaching of the present invention.

FIG. 2 illustrates an adjustable mount to which the slit jaws may be affixed in accordance with the second principal step of the teaching of the present invention. The adjustable mount shown in FIG. 2 basically comprises two elements 16 and 17 which may be inexpensively and conveniently fabricated of stamped metal and, by bending or other appropriate techniques, are formed to the cross-sectional shape illustrated in FIG. 3.

Figure 3:
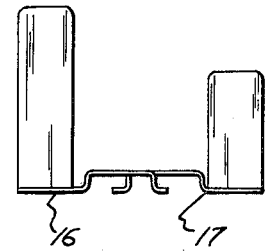
FIG. 3 is a cross-sectional view of the adjustable slit jaw mounts.

Though the novel steps of manufacture taught by the present invention do not necessarily contemplate the fabrication of multiple slit openings nor slit openings which are synchronously adjustable, a slit jaw mount formed as illustrated in the two views of FIGS. 2 and 3 provides a means by which two slit openings may be mounted so as to be synchronously adjustable in accurate spatial disposition in accordance with their predetermined alignment.

The second basic step of the novel method of manufacture, that of affixing the slit platen to adjustable slit jaw mounts, may be conveniently and appropriately accomplished while the placement of the slit platen 12 with respect to the slit jaw mount is accurately determined by the use of a suitable jig (not shown). Such a jig may be equipped with distinctively shaped pins spaced so that the slit platen is accurately positioned relative to the slit jaw mount when the holes 15 of the platen 12 are fitted to matching shaped pins of the jig.

The slit platen 12 may be affixed to the adjustable mount assembly in one of several ways. It has been found that a copper platen may be bonded to the adjustable slit mount assembly by a thermal-setting polymer, or other suitable bonding agent, a number of which are commercially available. This bonding procedure results in a structurally rigid assembly and is quickly and inexpensively accomplished without requiring a high degree of special training to reliably produce wholly satisfactory and accurate results. Equivalent techniques may be used to affix the slit platen to the movable mount members, however, such as soldering the platen to the mount or spot welding the slit platen to the mount at several appropriate points.

After the slit platen 12 has been affixed to the adjustable mount, marginal areas of the platen 12 are removed to complete the third principal step of the present invention. Such marginal areas are usually along an axis which is normal to the principal axis of the slit or slits. Thus, in the particular embodiment of the slit platen illustrated in FIG. 1, the marginal areas which are removed in accordance with the teaching of the present invention are along the aligned rectangular areas 14 at the top of the slit platen 12 and similarly along the aligned rectangular areas 14 at the bottom of the slit platen 12. The top and bottom marginal areas may be simply sheared from the platen 12 by any convenient means. It will now become readily apparent that the aligned rectangular areas 14 afford a convenient preformed indicia along which the marginal areas may be sheared from the platen 12. Additionally, the provision of the multiplicity of rectangular areas 14 significantly reduces the amount of the platen which must be cut through to remove the marginal areas. This facilitates removal of the marginal areas and helps insure that the alignment of the slits will not be disturbed in the course of that operation.

Figure 4:
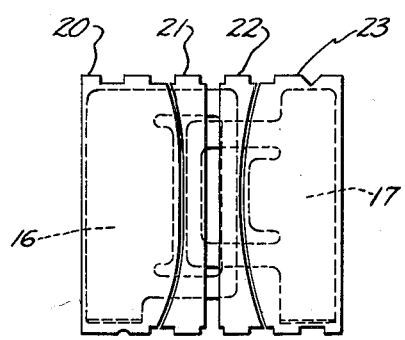
FIG. 4 is a view of the complete adjustable optical slit assembly fabricated in accordance with the teaching of the present invention.

The final slit assembly which results from these steps of fabrication is shown in FIG. 4. It will be seen that the single unitary platen 12 having three major openings 10, 11, and 13 as shown in FIG. 1 has, by the removal of the top and bottom marginal areas in accordance with the final step of the novel method of manufacture, become four separate movable members 20, 21, 22, and 23. In the particular embodiment shown in FIG. 4, two of the slit members 20 and 22 move as a unit and in synchronism with the remaining two members 21 and 23 which are also movable as a unit. Thus, the right-hand sides 21 and 23 of both slit openings 10 and 11 move in unison, while the left-hand sides 20 and 22 of both slit openings move in unison.

It may be seen that when the slit openings are widened elements 21 and 22 will be uniformly displaced toward each other. To accommodate this movement, the central opening 13 as shown in FIG. 1 is provided in the first operation performed upon the platen so that, when completed, the slit assembly is fully adjustable up to the desired maximum slit width. The central opening 13 must be at least twice as wide as the maximum slit opening desired, because in the particular slit assembly illustrated in the drawings, the slit jaw members 21 and 22 move toward each other in unison, each utilizing one half of the total width of central opening 13.

It is not necessary that both the right-hand and left-hand sides of the slit openings formed in accordance with the teaching of the present invention be movable with respect to each other. Where suitable, the same steps of the present inventive method of manufacture as explained hereinbefore may be carried out so as to fabricate a multiple slit arrangement in which only one side of each of the slits is movable in respect to the other. Similarly, single optical slits or other arrangements may be manufactured in accordance with the teaching of the present invention.

In order to preserve the predetermined slit jaw alignment, the adjustable mount as shown in FIG. 2 must be movable only in a horizontal direction. The mounts are appropriately arranged so as to be rigidly supported against any kind of vertical or similar movement other than in a horizontal direction. The mounts should be designed, however, to be flexibly movable in a horizontal direction and, thus, the final slit assembly is fabricated in accordance with the teaching of the present invention, providing slit openings which are adjustable in area but in which the original pre-alignment of the slit jaws is preserved regardless of such slit width adjustment. Co-pending application S.N. 628,079, filed December 13, 1956, discloses an appropriate and convenient mount which may be advantageously used in assembling an optical slit unit in accordance with the steps taught by the present inventive method of manufacture.

It will be appreciated by those skilled in the art that within the teaching and spirit of the new art of manufacture, the slit openings and the slit jaws may be formed in the slit platen by a number of different techniques. Thus, though photo-etching may be a most effective means of forming the slit openings in accordance with the steps of manufacture taught by the present invention, other techniques such as stamping, grinding, or cutting may be employed to form the slit openings in the slit platen.

Similarly, it will be apparent that a number of materials other than thin cooper plate may be employed as the slit platen. From an understanding of the present invention, it will be apparent that the highly desirable elimination of costly, complex, and time-consuming procedures which is made possible through the use of the new manufacture is not dependent for these advantageous features upon the use of any special materials and, therefore, the new method may be readily practiced with any of a number of platen materials. Plastic sheet, reinforced metal sheet, molded plastic, or other similar materials may be especially suitable for the fabrication of particular types of optical slits and the steps of manufacture taught by the present invention can be equally well performed with any of a wide variety of slit platen materials as necessitated by specific requirements.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. The method of manufacturing coacting adjustable optical slits which comprises the steps of forming first and second substantially trough-shaped slit mount members of different widths, providing the wider mount member with a slot at least of a length equal to the width of the other mount member, assembling said mount members into interlocking engagement by inserting a leg of the narrower mount member into the slot in the wider mount member in alignment therewith in a single plane, forming two slit openings of predetermined configuration in a platen within a unitary margin, removing a substantially rectangular area between the slit openings, affixing the right-hand sides of both slits to the first slit mount member, affixing the left-hand sides of both slits to the second slit mount member, and then removing marginal portions of the platen dividing the slit assembly into separate movable sections whereby to render the slit openings synchronously adjustable while maintaining the original slit alignments.

2. The method of manufacturing coacting adjustable optical slits which comprises the steps of forming first and second slit mount members each composed of two interconnected longitudinally displaced coplanar portions, assembling said first and second slit mount members in a single plane and adapted for relative coplanar movement, forming two slit openings of predetermined configuration in a platen within a unitary margin, removing an area between the slit openings, affixing the right-hand sides of both slits to said portions on the first slit mount member, affixing the left-hand sides of both slits to said portions on the second slit mount member, and then removing marginal portions of the platen dividing the slit assembly into separate movable sections to thereby render the slit openings synchronously adjustable while maintaining the original slit alignments.

3. The method of manufacturing coacting adjustable optical slits which comprises the steps of forming first and second slit mount members each composed of two interconnected longitudinally displaced coplanar portions, assembling said first and second slit mount members in a single plane, forming two slit openings of predetermined configuration in a platen within a unitary margin, removing a substantially rectangular area between the slit openings, affixing the right-hand sides of both slits to said portions on the first slit mount member, affixing the left-hand sides of both slits to said portions on the second slit mount member, and then removing marginal portions of the platen dividing the slit assembly into separate movable sections to thereby render the slit openings synchronously adjustable while maintaining the original slit alignments.

References Cited in the file of this patent

UNITED STATES PATENTS

| | | |
|---|---|---|
| 2,121,597 | Karl | June 21, 1938 |
| 2,440,254 | Dodson | Apr. 27, 1948 |
| 2,841,864 | Kelly | July 8, 1958 |
| 2,867,898 | Vosler et al. | Jan. 13, 1959 |